June 11, 1957     W. C. WEBER ET AL     2,795,134

AILERON LOAD TRANSDUCER

Filed Oct. 21, 1954

*INVENTORS*
DONALD BERNARD HOFFMAN
WILLIAM C. WEBER
BY

*ATTORNEYS*

United States Patent Office 2,795,134
Patented June 11, 1957

2,795,134

AILERON LOAD TRANSDUCER

William C. Weber, Perkasie, and Donald Bernard Hoffman, Hatboro, Pa.

Application October 21, 1954, Serial No. 463,835

5 Claims. (Cl. 73—141)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for measuring loads in aircraft control systems, more particularly, it relates to load measuring apparatus wherein the load sensitive elements form the resistance arms of a Wheatstone bridge.

The invention is illustrated by a representative modification of it, an aileron load transducer used to measure load on aircraft ailerons by insertion of one of the transducers in each of the two cables of an aileron.

In the design of control systems for airborne devices such as guided missiles, it is highly desirable to have means available for measuring the load on the control surfaces for the purpose of checking theoretical calculations and for use in design of the control surfaces and auxiliary elements.

In the past, this measurement has generally been accomplished by affixing strain gages on areas of the control surface, itself. This method is unsatisfactory for a number of reasons. The installation is quite cumbersome and is a local one requiring installation on each separate control surface upon which the load is to be measured. Also, the output obtained is not suitable for telemetering. Prior strain gage installations for measuring hinge moments, such as those resulting from aileron movements, have no versatility of movement, are susceptible to damage in use due to their exposed location on the control surfaces, and their structure, do not provide a controlled atmosphere for the operating parts and are thus subject to error from temperature and humidity changes, and will not hold calibration over a long period of time. Other major disadvantages of the prior art strain gage installations are that their sensitivity is not of the order required for telemetering purposes, they cannot be operated at a maximum strain because no safety feature is provided to insure that the lever or other element on which they have been placed will perform its function satisfactorily after the sensing element of the device has parted due to load above the maximum strain point. It is customary to design critical structures with a safety factor of 1½ to 2, preventing maximum strain sensitivity.

It is, therefore, an object of this invention to provide apparatus for measuring tensile load which has an order of sensitivity at least high enough for telemetering applications.

It is another object of this invention to provide compact and rugged tensile load measuring apparatus having a high order of sensitivity which is insensitive to temperature and humidity changes.

It is still another object of this invention to provide load measuring apparatus of the type utilizing the Wheatstone bridge principle, which is adaptable for measuring load in a single cable or is adaptable for measuring differential loads in the two cables operating an aircraft control surface and which gives measurements independent of the normal tensioning load maintained in aircraft control cables.

It is a further object of this invention to provide load measuring apparatus having a structure providing for the protection of the sensing element from torsional and compressive stresses.

It is a still further object of this invention to provide an aileron load transducer for installation in each of the two aileron control cables to measure the load on the aileron, which is provided with safety features insuring the continued functioning of the cable linkage after the sensing element of the device has been parted due to load applied beyond its yield point.

The structure and operation of the invention by which the above objects are accomplished are best understood by reference to the accompanying drawings in which, Fig. 1 is a side elevational view of the modification illustrating the invention, an aileron load transducer, with the outer shell partially cut away to show the inner structure;

Figure 1:
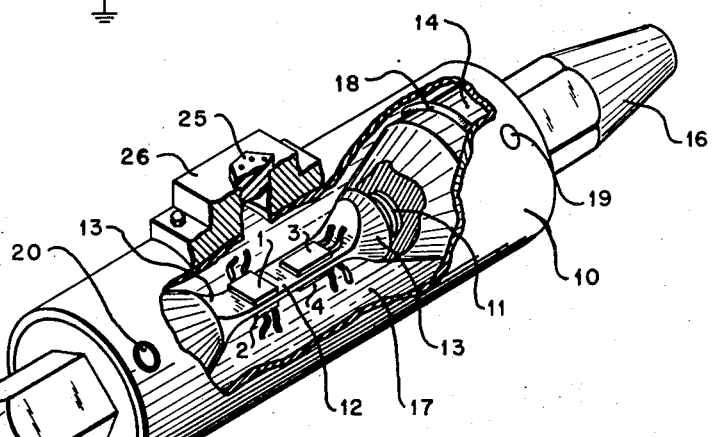

Referring to Fig. 1, the outer case of the aileron load transducer is represented by the numeral 10. The sensing element 12 consists of an aluminum gage length machined to a predetermined thickness which is the minimum cross sectional area required to prevent deformation in the load range of the transducer. Strain sensitive elements 1, 2, 3 and 4 are bonded to sensing element 12. The bonding agent is a thermosetting resin which provides a secure bond between the strain gages or strain sensitive elements and sensing element 12. The strain gages are of standard commercial design.

Figure 2:
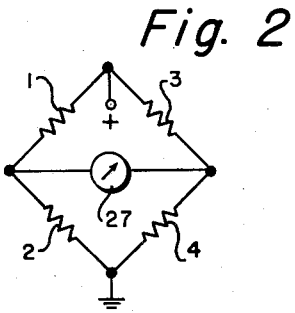
Fig. 2 is a showing of the arrangement of the strain detecting elements as resistance arms of a Wheatstone bridge for the measurement of load in a single cable.
Figure 3:
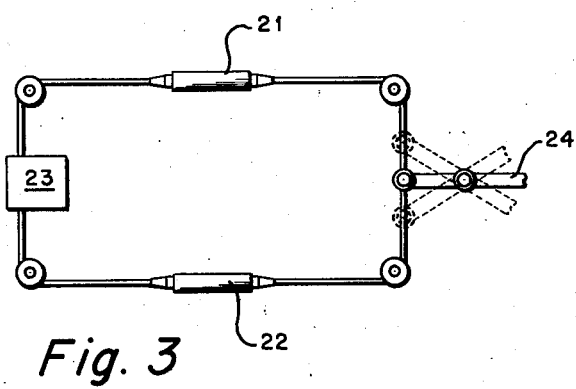
Fig. 3 is a schematic showing of the installation of two transducers in the control system of an aileron for the purpose of measuring load on the aileron surface.

For supporting the sensing element 12 in operating position, mounting supports 13 made integral therewith and terminating in threaded studs 11 are provided. Threaded studs 11 are aadptd to be removably attached to aluminum shoulders 14 and 15, as shown, to permit changing of the sensing element 12 as required to change the range load of the transducer. When the aileron load transducer is used to measure load in a single cable, a strain gage arrangement as shown in Fig. 2 is used on the sensing element. The strain gages form the resistances of a Wheatstone bridge. If differential load is being measured between two cables, such as the two control cables of an aileron, one of the transducer units is incorporated in each cable of the system as shown schematically in Fig. 3. In Fig. 3, the numerals 21 and 22 indicate transducers incorporated in separate control cables of the aileron control system. The servomotor of the system is indicated at 23 and the control surface at 24. The strain sensitive elements 1, 2, 3 and 4 are arranged on respective sensing elements of transducers 21 and 22 as shown in arrangement 21a and 22a of the bridge circuit of Fig. 4, incorporating meter 27, to form the resistance arms of a Wheatstone bridge. To permit insertion in the cable linkage, hexagonal turnbuckle ends 16 are provided to be threadably or otherwise attached by an extension, not shown, to shoulders 14 and 15. The chamber 17 enclosed by outer case 10 and containing sensing elment 12 is sealed by O ring 18 between the outer case and shoulders 14 and 15. Tapered locking pin 19 extending into outer case 10, turnbuckle end 16, and out through outer case 10 in press-fit relationship positively locks the turnbuckle end 16 and shoulder 14 to the outer case 10.

Figure 5:
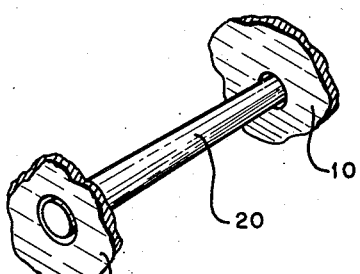
Fig. 5 is a detail showing of the structural relationship between a safety pin and the outer case of the device, which allows elongation of the sensing element of the transducer within its elastic limit.

Referring to Fig. 5, there is shown the structural arrangement by which small relative movement between shoulder 15 and the outer case 10 is permitted, so that the sensing element 12 will be elongated by loads applied to turnbuckle ends 16. The numeral 20 designates a tapered pin which is press-fitted into shoulder 15 and the extension of turnbuckle 16 with its ends extending through outer case 10 and terminating flush with the case. Adequate diametrical clearance between the pin 20 and the outer case 10 is provided to alow for the maximum allowable elongation of the sensing element before permanent deformation. This structure permits slight relative movement of shoulder 15 with respect to outer case 10 in a plane parallel to that of sensing element 12 so that the sensing element is subjected to tensional loads applied to turnbuckle 16. This structural feature also furnishes a safety factor insuring that the cable linkage will perform its function should the sensing element part. The locking relationship between shoulders 14 and 15 provided by locking pin 19 and safety pin 20 protects the thin sensing element 12 from other than slight torsional and compressive loads.

A Winchester plug 25 is mounted on a support 26 on the outer case 10 for receiving electrical wires leading from the strain sensitive elements. Proper orientation of the strain sensitive elements of the bridge, as shown in Figs. 2 and 4, is accomplished by the correct orientation in electrical plug 25 of electrical leads between the stress sensitive elements and the electrical plug.

Figure 4:
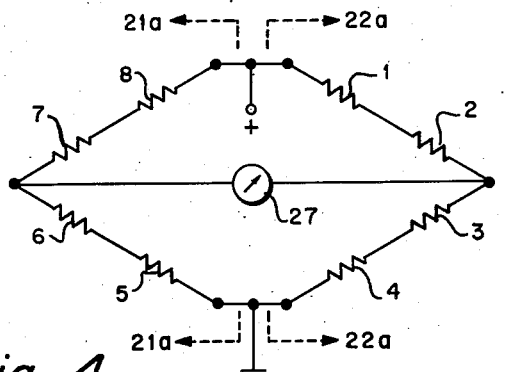
Fig. 4 is a showing of the arrangement of the strain detecting elements as resistance arms of a Wheatstone bridge for the measurement of differential load in a dual control cable system, as shown in Fig. 3.

The schematic diagram of Fig. 4 shows a manner of coupling two aileron load transducers together to form a resistance bridge. Strain sensitive elements 1, 2, 3 and 4 (arrangement 22a) are one-half of the bridge. Strain sensitive elements 5, 6, 7 and 8 (arrangement 21a) form the other half of the bridge. These transducers operate on the principle of increasing and decreasing tension on the control cables, and reflect differential loading. Except for the turnbuckle ends which are of steel, all of the parts of the transducer are of aluminum. Other suitable materials may be used. While a specific structure has been described for the purpose of illustrating the invention, equivalent structures are obviously within the scope of the invention.

The operation of the aileron load transducer described above as an illustrative embodiment of the present invention, is as follows for measuring load on an aileron surface operated by two control cables. A transducer is incorporated into each of the control cables of an aileron by means of turnbuckle ends 16. The sensing element 12 selected is one capable of measuring loads within the calculated range of loading on the aileron surface. At sensing element 12 is interchangeable, elements of suitable cross sectional area may be chosen as required. Tensional loads resulting from airloads on the aileron surfaces are transduced by the Wheatstone bridge arrangement of the strain sensitive elements into an electrical signal. In the case of guided missiles, this signal may be transmitted through conventional circuits of the telemetering transmitter to the ground station, or in the case of piloted aircraft, may be recorded on an oscillograph in the plane. The normal tension which is kept on the control cables to prevent slack is not reflected by the combined transducer output. After the sensing element 12 has yielded, the tolerance between the safety pin 20 and the outer case 10 has been taken up and the case now acts as a connecting link in the cable linkage between turnbuckle ends 16, thus providing the required safety factor which permits continued functioning of the cable linkage.

The fact that the sensing element is machined to the smallest possible thickness for the particular application makes it highly sensitive to minute loads.

Various structural features protect the sensing elements from errors attendant to the application of prior devices. The fact that the sensing elements are housed in an enclosed chamber protecting them from outside atmospheric and weather conditions eliminates a source of error and provides relatively constant resistance to ground between the bridge and the sensing element. In addition, this feature protects the sensing element from damage, a factor which is generally conducive to long life of the bridge. The orientation of the strain sensitive elements provides full temperature compensation of the resistive elements. The locking relationship between the sensing element and the outer case protects the fragile element from destruction by torsion and compression and also minimizes the possibility of errors from these sources. All of the above features combine to provide a sensitivity in the device of the order required for telemeteing purposes.

An important feature of the invention is its application to the problem of measuring differential load in dual aileron cables, independent of the tension normally kept in aileron control cables for preventing slack. Other advantages of the invention are the interchangeability of the sensing elements 12, and the structure permitting relative movement between the case and shoulder.

While the invention has been illustrated by the modification of an aileron transducer applied to the problem of measuring load on an aileron surface having a dual cable control system, it is obviously not restricted to this modification or this application. As will be obvious to those skilled in the art, the invention may be used for measuring stress in a single cable or for measuring load on dual cable controlled surfaces of any type airplane, missile or other airborne device. The application utilizing two transducers can conceivably be used to measure load on any surface controlled by dual cables.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for measuring tensile stress, comprising: an outer circular casing having a pair of oppositely disposed openings therein at either end; a sensing element; a mounting support for each of the ends of said sensing element made integral therewith; a threaded stud terminating each of said mounting supports; a round shoulder for each of said mounting supports threadably attached by one of its ends to said threaded stud and having a hole transversally therethrough; said sensing element, said mounting supports, said threaded studs and said shoulders being housed within said outer case; strain sensitive elements on either side of said sensing element bonded thereto and arranged to form the resistance arms of a Wheatstone bridge; an O ring between said shoulders and said outer case effecting a sealed enclosure housing said sensing element and said mounting supports; turnbuckle ends having treaded extensions with holes transversally therethrough, attached by means of said extensions to each of the other ends of said shoulders for incorporating said apparatus in a member to be subjected to stress; a locking pin press-fitted in the holes in one end of said case, the hole in said threaded extension, and the hole in one of said shoulders, thereby locking the extension of said shoulder to the outer case; a tapered safety pin press-fitted in the hole in the other shoulder and the hole in the turnbuckle extension attached thereto, with its ends extending through the holes in the other end of said case, diametrical clearance being provided between the ends of said safety pin and the holes in said other end of said case; whereby slight relative movement between said outer case and said other shoulder in a plane substantially parallel to the plane of said sensing element is permitted, so that when said apparatus is incorporated in said member by said linking means, said sensing element is protected from torsional and compressive stresses and may be extended by tensional stress in said member to its yield point, and when said yield point has been reached said outer case becomes an operating link in said member to insure its normal functioning.

2. Apparatus for measuring differential tensile stress in the cables of a dual cable controlled system, consisting of an aileron load transducer for incorporation in each of said cables, each transducer comprising: a sensing element having a mounting support for each of its ends made integral therewith; a shoulder for each of said mounting supports attached thereto, said sensing element and said shoulders being housed within an outer casing; means between said shoulders and said outer casing effecting a sealed enclosure housing said sensing element; linking means attached to each of the free ends of said shoulders for incorporating said transducer in a cable member to be subjected to stress; means for locking one of said shoulders to said outer casing; means connecting the other shoulder and the outer casing in a manner to permit slight relative axial and rotational movement of said sensing element with respect to said casing before locking said other shoulder and casing; strain sensitive means on said sensing element, the strain sensitive means of the sensing element of each transducer forming resistance arms of a Wheatstone bridge; whereby the output of said bridge gives the differential strain in the two cables.

3. Apparatus for measuring load on an aileron surface controlled by two cables consisting of an aileron load transducer for incorporation in each of said cables, each transducer comprising: an outer circular casing having a pair of oppositely disposed openings therein at either end; a sensing element; a mounting support for each of the ends of said sensing element made integral therewith; a threaded stud terminating each of said mounting supports; a round shoulder for each of said mounting supports threadably attached by one of its ends to said threaded stud and having a hole transversally therethrough; said sensing element, said mounting supports, said threaded studs and said shoulders being housed within said outer case; an O ring between said shoulders and said outer case effecting a sealed enclosure housing said sensing element and said mounting supports; turnbuckle ends having threaded extensions with holes transversally therethrough, attached by means of said extensions to each of the other ends of said shoulders for incorporating said transducer in a member to be subjected to stress; a locking pin press-fitted in the holes in one end of said case, the hole in said extension, and the hole in one of said shoulders, thereby locking the extension and the shoulder to said outer case; a tapered safety pin press-fitted in the hole in the other shoulder and the hole in the turnbuckle extension attached thereto, with its ends extending through the holes in the other end of said case, diametrical clearance being provided between the ends of said safety pin and the holes in said other end of said case, whereby slight relative movement between said outer case and said other shoulder in a plane substantially parallel to the plane of said sensing element is permitted, so that when said apparatus is incorporated in said member by said linking means, said sensing element is protected from torsion and compression and may be elongated by tensional stress in said member to its yield point, and when said yield point has been reached said outer case becomes an operating link in said member to insure its normal functioning; and strain sensitive means on said sensing element, the strain sensitive means of each sensing element forming resistance arms of a Wheatstone bridge so connected that the output gives the differential stress on the dual cables and therefore the load on the aileron surface.

4. Apparatus for measuring tensile stress, comprising: an outer casing, a sensing element having a mounting support for each of its ends made integral therewith, a shoulder for each of said mounting supports attached thereto, said sensing element and said shoulders being housed within said outer casing, strain sensitive elements secured to said sensing element and arranged as resistance arms of a Wheatstone bridge, means between said shoulders and said outer casing effecting a sealed enclosure housing said sensing element, linking means attached to the ends of said shoulders for incorporating said apparatus in a member to be subjected to stress; means for locking one of said shoulders to said outer casing, means connecting the other shoulder and said outer casing for transferring torsional loads exceeding a small, predetermined value from said sensing element to said casing thereby insuring that said sensing element is subject to substantially pure tension loads at all times.

5. The apparatus of claim 4 in which said connecting means includes a pin passing transversely through both said other shoulder and said casing, the latter being provided with a pin opening whose wall is normally spaced from said pin thereby permitting a small range of relative, rotational movement of said sensing element with respect to said casing.

References Cited in the file of this patent
UNITED STATES PATENTS

| | | |
|---|---|---|
| 2,414,161 | Moore | Jan. 14, 1947 |
| 2,440,706 | Tint | May 4, 1948 |
| 2,582,886 | Ruge | Jan. 15, 1952 |
| 2,590,626 | Jones | Mar. 25, 1952 |
| 2,663,187 | Wood | Dec. 22, 1953 |